Patented Sept. 12, 1933

1,926,572

UNITED STATES PATENT OFFICE 1,926,572

BAKING POWDER

Edward Hyatt Wight, Baltimore, Md., assignor to The Oberphos Company, Baltimore, Md., a corporation of Maryland No Drawing. Application August 8, 1931
Serial No. 556,035

3 Claims. (Cl. 99—10)

This invention relates to an improved process for manufacturing baking powders and self-rising flours, and more particularly to an improved method of preparing monocalcium phosphate and similar acid salts used in such materials.

The typical baking powder consists of a dry mixture of bicarbonate of soda and one or more compounds which are capable of decomposing the bicarbonate of soda to release the full content of carbon dioxide. Usually a drying agent such as flour or starch is also added, the purpose of which is to prevent the premature reaction between the two active ingredients and also to insure uniform distribution of these materials.

A number of ingredients are used in conjunction with the bicarbonate of soda to form a final baking powder. Of these the more common are tartaric acid and acid tartarates, sodium and potassium acid sulfates, alum and the acid salts of phosphoric acid. The use of acid phosphates as one of the active ingredients in baking powders and self-rising flours has increased considerably in recent years. The total manufacture of such phosphatic salts for this purpose now amounts to over twenty-five million pounds annually. Four phosphatic salts are employed for this purpose. These are monocalcium phosphate, monopotassium phosphate, monosodium phosphate and sodium acid pyrophosphate. These materials, mixed with sodium bicarbonate and a filler, are known as the straight phosphate baking powders. The first three salts are known in the trade as fast acting materials because their reaction with sodium bicarbonate is initiated promptly even in cold dough. To retard this action it is customary to add to the baking powder small amounts of calcined sodium aluminum sulfate.

The present invention is more particularly concerned with improvements in the manufacture of monocalcium phosphate for this purpose, although it will be understood that the improvements hereinafter described are equally applicable to the preparation of other salts, such as monopotassium and monosodium phosphate.

In the usual production of monocalcium phosphate according to the present methods, phosphoric acid and lime stone, hydrated lime or quick lime, are fed into rotary mixer fitted with paddles or other stirring devices and the mixture is agitated in the container until the product sets into a relatively stiff mass. Usually the material is made up with batches of about five hundred pounds of the hydrated lime or equivalent calcium containing material. The acid strength usually runs between 50 and 55° Bé.

When strong phosphoric acid is employed the reaction product very rapidly sets due to the high temperatures obtained and to the evolution of water. The rapidity of this setting renders it very difficult to obtain a uniform mixture because after a short period of time the mechanical operation of mixing is practically prevented due to the stiffness of the mass. This is a disadvantage because, due to inadequate or incomplete mixing, the product may contain free phosphoric acid or unreacted lime.

It is an object of the present invention to provide an improved method of manufacturing monocalcium phosphate, or equivalent materials, for use in the manufacture of baking powders or for other leavening purposes.

Another object is to provide an improved baking powder.

Yet a further object is to provide an improved process for the commercial manufacture of phosphate baking powders.

A further object is to provide an improved process for manufacturing baking powders by which a phosphatic salt of high purity and neutralizing strength may be obtained.

Yet another object is to provide an improved process for manufacturing baking powders which may be carried out in a minimum of time and in a minimum of apparatus.

A further object is to genrally improve the manufacture of baking powders.

Monocalcium phosphate as well as the other baking powders are sold largely on the basis of their neutralizing strength in terms of sodium carbonate. When monocalcium phosphate reacts with sodium bicarbonate, upon the assumption that the reaction goes to completion, one hundred parts of pure monocalcium phosphate will react completely with 88.89 parts of sodium bicarbonate without leaving any residual sodium carbonate, according to the following equation:

$3CaH_4(PO_4)_2H_2O + 8NaHCO_3 =$
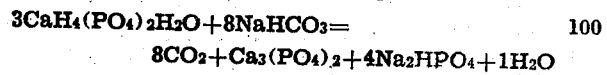
$8CO_2 + Ca_3(PO_4)_2 + 4Na_2HPO_4 + 1H_2O$ It is desirable, therefore, to obtain as high a neutralizing strength of monocalcium phosphate as is possible. The optimum neutralizing strength, however, is very difficult to obtain because in order to insure this high strength it appears that some free phosphoric acid is necessary. However, this free acid is very detrimental to the physical or mechanical condition of the final product, impairing the keeping qualities and upsetting the even action in the mixing and baking processes. It also tends to cause premature action on the other ingredients in the baking powder resulting in the evolution of carbon dioxide and the deterioration of the product. It is also believed by some that the free acid causes rancidity when material containing it is used as an ingredient in self-rising flour. Therefore, while the theoretical neutralizing strength of monocalcium phosphate is 88.9, in the products as actually manufactured this neutralizing strength amounts only to about 80 to 82. The products as actually sold contain enough dicalcium phosphate to insure the absence of free phosphoric acid.

According to the present improvement an improved monocalcium phosphate salt or equivalent carbon dioxide liberating material may be prepared by simultaneously charging predetermined quantities of lime, or equivalent calcium containing substances, and phosphoric acid through a mixing nozzle of special design and into an autoclave wherein the two materials are mixed and are caused to react. The reaction vessel preferably is constituted by a horizontal rotary autoclave to which the ingredients are charged through a hollow shaft. The apparatus employed may be substantially similar to that shown and described in copending application Serial No. 393,826. In such circumstances respectively proportioned and predetermined quantities of the phosphoric acid and lime stone (or hydrated lime or quick lime) are charged to the reaction vessel. Preferably a vacuum pump is connected to the reaction vessel and sets up a partial vacuum in the container to assist in rapid injection or charging of the materials. After the materials have been charged the autoclave may be sealed and then rotated to cause a continuous agitation of the mass. This rotation insures a constant resurfacing of the materials, thus bringing each particle of the solid into intimate contact with the acid.

As the materials react, gases and vapors are generated and autogenous pressure is built up within the autoclave. This pressure may be largely maintained, but may be reduced to any desired extent by operating any suitably positioned relief valve. In order to facilitate the reaction, the autoclave may be formed with a hollow jacket through which a heating medium such as steam may be coursed. These conditions of digestion under heat and pressure and with continuous agitation insure a rapid and complete conversion of the materials into monocalcium phosphate.

After the reactions have run to completion the product may be cured or dried in the same container in which the reactions were carried out. This may readily be done by opening a relief valve on the autoclave to reduce the pressure therein to atmospheric. This permits the escape of evolved gases or vapors and insures a rapid drop in temperature which aids materially in crystallizing the product.

To insure a complete drying the autoclave may be sealed and the vacuum pump operated to set up a partial vacuum of any desired degree in the autoclave. During this operation the autoclave preferably is rotated so as to agitate the materials to insure the expulsion of the water content at a relatively low temperature. Inasmuch as the reaction was carried out under high pressure a relatively large quantum of heat is retained in the mass. This sensible heat, it will be appreciated, is utilized during the drying period when operating with a vacuum. Therefore the quantity of heat added need not be very great.

It will be appreciated that inasmuch as the vessel in which the product is prepared is a rotating autoclave, it may be used as the element in which the products may be mixed with additive agents, such for example as calcined sodium aluminum sulfate or with diluents such as flour or starch. These materials may be added just prior to the drying period and subjected to the conditions of vacuum drying under agitation, together with the freshly prepared product. In these circumstances the operations of drying the product and/or mixing this product with added ingredients are performed simultaneously.

However, if desired, the addition agents may be added to the autoclave after the vacuum drying period. In such circumstances the dried monocalcium phosphate or similar salt may be retained in the autoclave and may be mixed therein, as by rotating the autoclave, with the added ingredients for a period of time sufficient to insure thorough incorporation of the components.

Inasmuch as the autoclave is provided with a blow-off valve and is connected to a vacuum pump, the superatmospheric pressures during the reaction period and the subatmospheric pressures during the drying period may be controlled to any desired extent. Similarly the temperature during the reaction and drying periods may be regulated by controlling the flow of the heating medium through the hollow thermal jacket. Inasmuch as the material is charged through one hollow shaft in the autoclave and inasmuch as the vacuum pump is connected to another hollow shaft, the mass may be maintained under continuous agitation during the reaction and drying without affecting the flexibility of pressure or temperature control.

While the process has been described particularly with respect to the manufacture of monocalcium phosphate, it is equally applicable to the preparation of equivalent salts, such as the monosodium and monopotassium phosphates. While a certain preferred method has been described, it is to be understood that this is given largely by way of example and not as defining the limits of the invention. The invention is considered to reside in the concept of the preparation of the stated or equivalent materials by reacting phosphoric acid and a suitable base material under conditions of superatmospheric pressure and continuous agitation, coupled with the supplementary features of vacuum drying, under conditions of agitation in the same vessel and the admixture of any desired ingredients therein. It will, therefore, be observed that according to the present process a complete product may be obtained by using substantially only one element. In this element the initial materials are mixed and reacted, dried, admixed with any desired proportion of added ingredients and operated so as to thoroughly and homogeneously incorporate these ingredients.

I claim:

1. A process of manufacturing baking powders comprising digesting phosphoric acid and a lime base in substantially molecular proportions in a pressure vessel while agitating the mass, maintaining the mass in the vessel under a superatmospheric pressure sufficient to retain the mass in a slurry form and maintaining the slurry form until the reactions are complete then vacuum drying the mass in the vessel while continuously agitating and then adding other ingredients to the mass in the vessel and agitating to secure thorough mixing of the materials.

2. A process of manufacturing baking powders comprising digesting phosphoric acid and a lime base in substantially molecular proportions in a closed rotating vessel under superatmospheric pressure sufficiently high to maintain the mix in a plastic condition, then reducing the pressure to atmospheric and adding other ingredients to the moist mass and then submitting the mass to a vacuum to dry the materials therein.

3. A process of manufacturing baking powders comprising digesting phosphoric acid and a lime base in such proportions as to form essentially mono-calcium phosphate, in a closed rotating vessel under superatmospheric pressure sufficiently high to maintain the mix in a slurry form, then reducing the pressure to atmospheric and while the mass is still moist adding other desired ingredients, then rotating the vessel and setting up a vacuum therein to simultaneously dry and mix the materials.

EDWARD HYATT WIGHT.